US008756536B2

(12) United States Patent
Arai

(10) Patent No.: US 8,756,536 B2
(45) Date of Patent: Jun. 17, 2014

(54) GENERATION METHOD, STORAGE MEDIUM, AND INFORMATION PROCESSING APPARATUS

(71) Applicant: Canon Kabushiki Kaisha, Tokyo (JP)

(72) Inventor: Tadashi Arai, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/781,873

(22) Filed: Mar. 1, 2013

(65) Prior Publication Data

US 2013/0246982 A1     Sep. 19, 2013

(30) Foreign Application Priority Data

Mar. 15, 2012   (JP) ................. 2012-059103

(51) Int. Cl.
| G06F 17/50 | (2006.01) |
| G21K 5/00 | (2006.01) |
| G06K 9/00 | (2006.01) |
| G03F 1/00 | (2012.01) |
| G06F 19/00 | (2011.01) |
| G03F 1/36 | (2012.01) |
| G03F 1/38 | (2012.01) |

(52) U.S. Cl.
CPC ............ *G06F 17/5081* (2013.01); *G06F 19/00* (2013.01); *G06F 2217/12* (2013.01); *G06F 2217/14* (2013.01); *G21K 5/00* (2013.01); *G06K 9/00* (2013.01); *G03F 1/0069* (2013.01); *G03F 1/0092* (2013.01); *G03F 1/36* (2013.01); *G03F 1/38* (2013.01)
USPC .................. 716/53; 716/52; 716/54; 716/55; 716/56; 716/112; 700/98; 700/110; 700/120; 700/121; 430/5; 378/35

(58) Field of Classification Search
CPC . G06F 17/5081; G06F 19/00; G06F 2217/12; G06F 2217/14; G21K 5/00; G06K 9/00; G03F 1/0069; G03F 1/0092; G03F 1/36; G03F 1/38
USPC .............. 716/53, 52, 54, 55, 56, 112; 700/98, 700/110, 120, 121; 430/5; 378/35
See application file for complete search history.

(56) References Cited

U.S. PATENT DOCUMENTS 5,821,015 A * 10/1998 Sugawara ................... 430/5
6,127,071 A * 10/2000 Lu ............................. 430/5

(Continued)

FOREIGN PATENT DOCUMENTS

| JP | 2009-093138 A | 4/2009 |
| JP | 2009-094109 A | 4/2009 |

(Continued)

OTHER PUBLICATIONS

Nelder, et al., A Simplex Method for Function Minimization, Computer Journal, vol. 7, pp. 308-313, 1965 (Cited in Specification).

*Primary Examiner* — Phallaka Kik
(74) *Attorney, Agent, or Firm* — Rossi, Kimms & McDowell LLP

(57) ABSTRACT

The present invention provides a generation method of generating data for a mask pattern to be used for an exposure apparatus including a projection optical system for projecting a mask pattern including a main pattern and auxiliary pattern onto a substrate, including a step of setting a generation condition under which the auxiliary pattern is generated, and a step of determining whether a value of an evaluation function describing an index which indicates a quality of an image of the mask pattern calculated, wherein if it is determined that the value of the evaluation function falls outside a tolerance range, the generation condition is changed to set a new generation condition.

9 Claims, 12 Drawing Sheets

(56) References Cited

U.S. PATENT DOCUMENTS

| | | | |
|---|---|---|---|
| 6,137,901 A * | 10/2000 | Harazaki | 382/144 |
| 6,562,638 B1 * | 5/2003 | Balasinski et al. | 438/14 |
| 6,563,566 B2 | 5/2003 | Rosenbluth et al. | |
| 7,001,693 B2 * | 2/2006 | Liebmann et al. | 430/5 |
| 7,449,689 B2 * | 11/2008 | Nagatomo et al. | 250/310 |
| 7,571,417 B2 * | 8/2009 | Izuha et al. | 716/53 |
| 7,735,053 B2 * | 6/2010 | Harazaki | 716/53 |
| 7,790,337 B2 * | 9/2010 | Misaka | 430/5 |
| 7,886,262 B2 * | 2/2011 | Chew et al. | 716/132 |
| 7,941,768 B1 * | 5/2011 | Wei | 716/54 |
| 7,995,832 B2 * | 8/2011 | Xiong et al. | 382/144 |
| 2003/0198872 A1 * | 10/2003 | Yamazoe et al. | 430/5 |
| 2004/0170905 A1 * | 9/2004 | Liebmann et al. | 430/5 |
| 2005/0134866 A1 * | 6/2005 | Kyoh et al. | 356/616 |
| 2005/0153217 A1 * | 7/2005 | Izuha et al. | 430/5 |
| 2005/0233226 A1 * | 10/2005 | Osawa et al. | 430/5 |
| 2006/0057475 A1 * | 3/2006 | Liebmann et al. | 430/5 |
| 2006/0108524 A1 * | 5/2006 | Nagatomo et al. | 250/310 |
| 2006/0184908 A1 * | 8/2006 | Minami et al. | 716/10 |
| 2007/0100591 A1 * | 5/2007 | Harazaki | 703/2 |
| 2007/0184361 A1 * | 8/2007 | Misaka | 430/5 |
| 2008/0003510 A1 * | 1/2008 | Harazaki | 430/5 |
| 2008/0046846 A1 * | 2/2008 | Chew et al. | 716/2 |
| 2008/0170774 A1 * | 7/2008 | Xiong et al. | 382/144 |
| 2009/0199148 A1 * | 8/2009 | Kyoh et al. | 716/11 |
| 2009/0265680 A1 * | 10/2009 | Izuha et al. | 716/21 |
| 2010/0055581 A1 * | 3/2010 | Fujimura et al. | 430/5 |
| 2010/0129740 A1 * | 5/2010 | Wang | 430/30 |
| 2011/0107277 A1 | 5/2011 | Tsujita et al. | |
| 2012/0005634 A1 * | 1/2012 | Seltmann et al. | 716/53 |
| 2012/0019805 A1 | 1/2012 | Yamazoe | |
| 2012/0054695 A1 * | 3/2012 | Izuha et al. | 716/53 |
| 2012/0096413 A1 * | 4/2012 | Arai | 716/53 |
| 2012/0107730 A1 * | 5/2012 | Ishii et al. | 430/5 |
| 2013/0034807 A1 * | 2/2013 | Fujimura et al. | 430/5 |
| 2013/0295698 A1 * | 11/2013 | Pforr et al. | 438/14 |
| 2013/0337372 A1 * | 12/2013 | Fujimura et al. | 430/5 |

FOREIGN PATENT DOCUMENTS

| | | |
|---|---|---|
| JP | 2011-095729 A | 5/2011 |
| JP | 2012-088511 A | 5/2012 |
| JP | 2012-098397 A | 5/2012 |

* cited by examiner

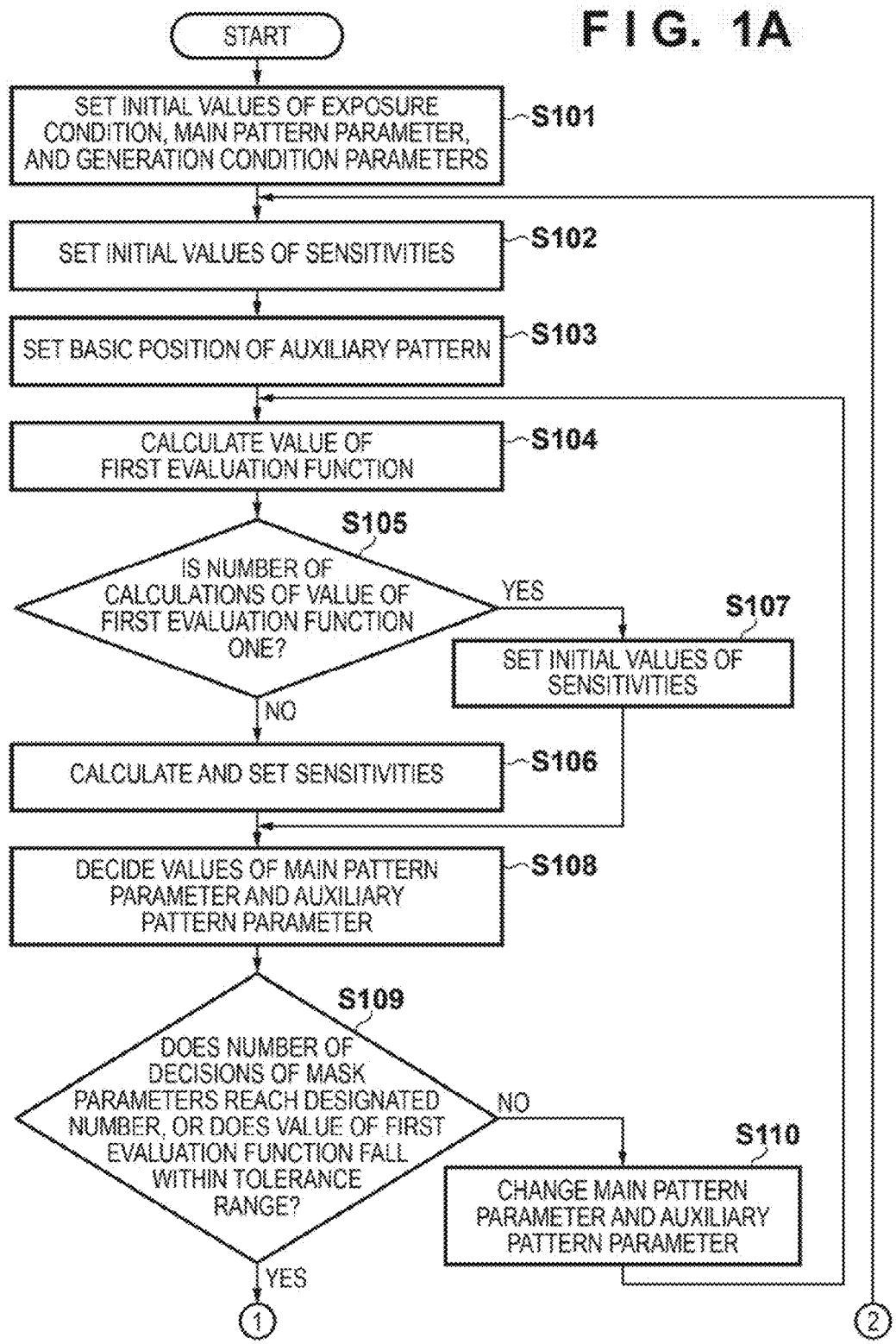

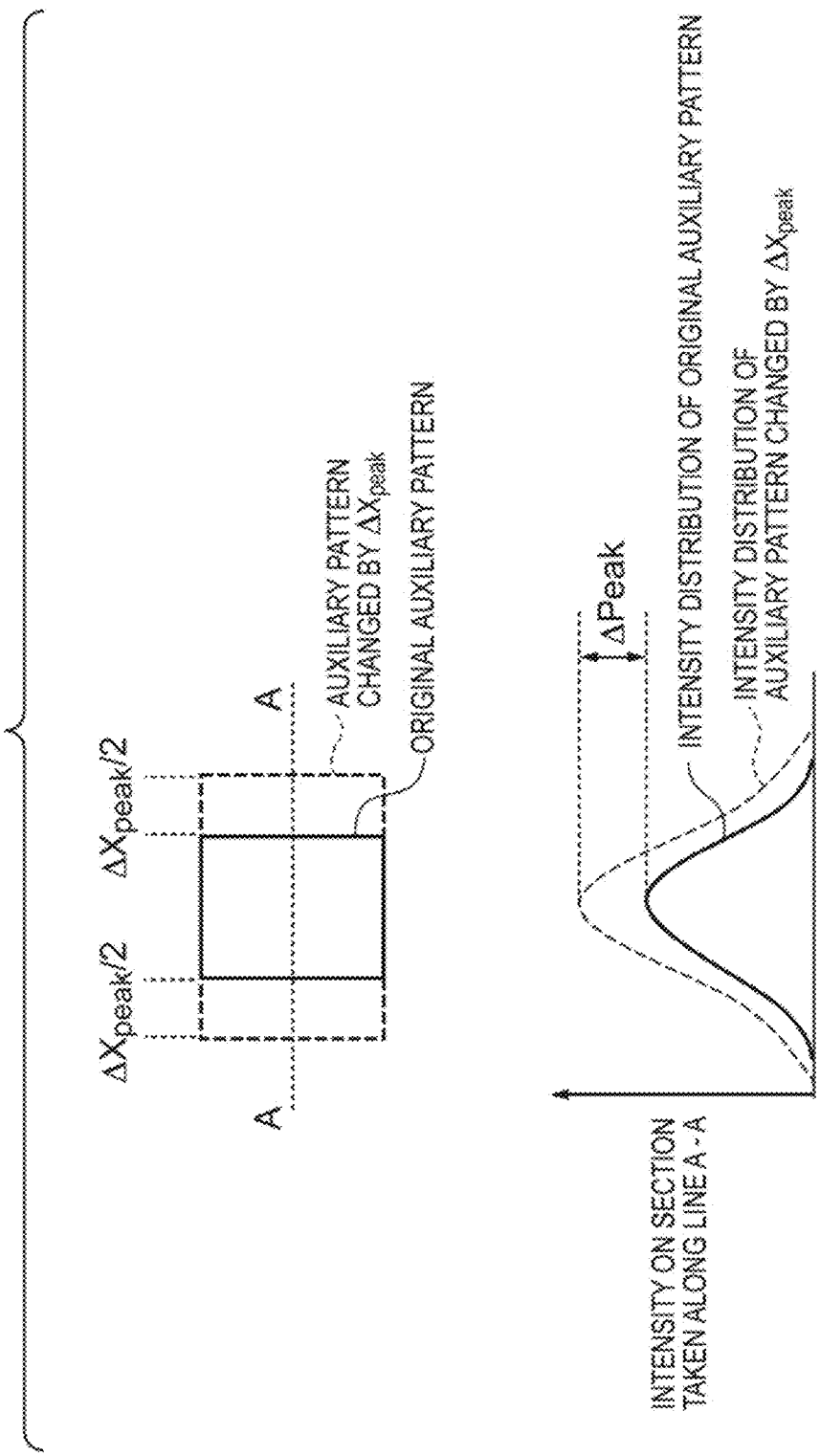

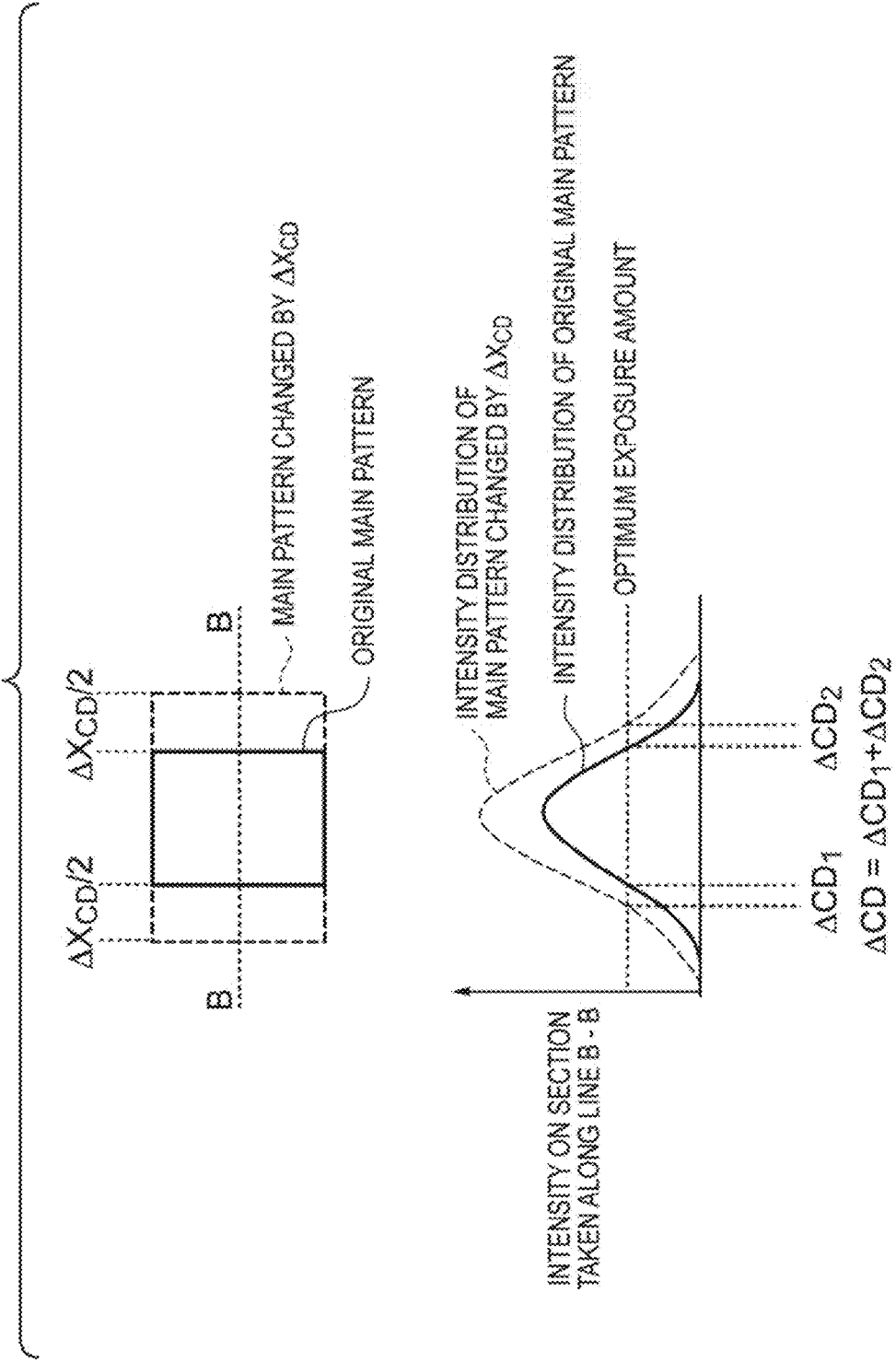

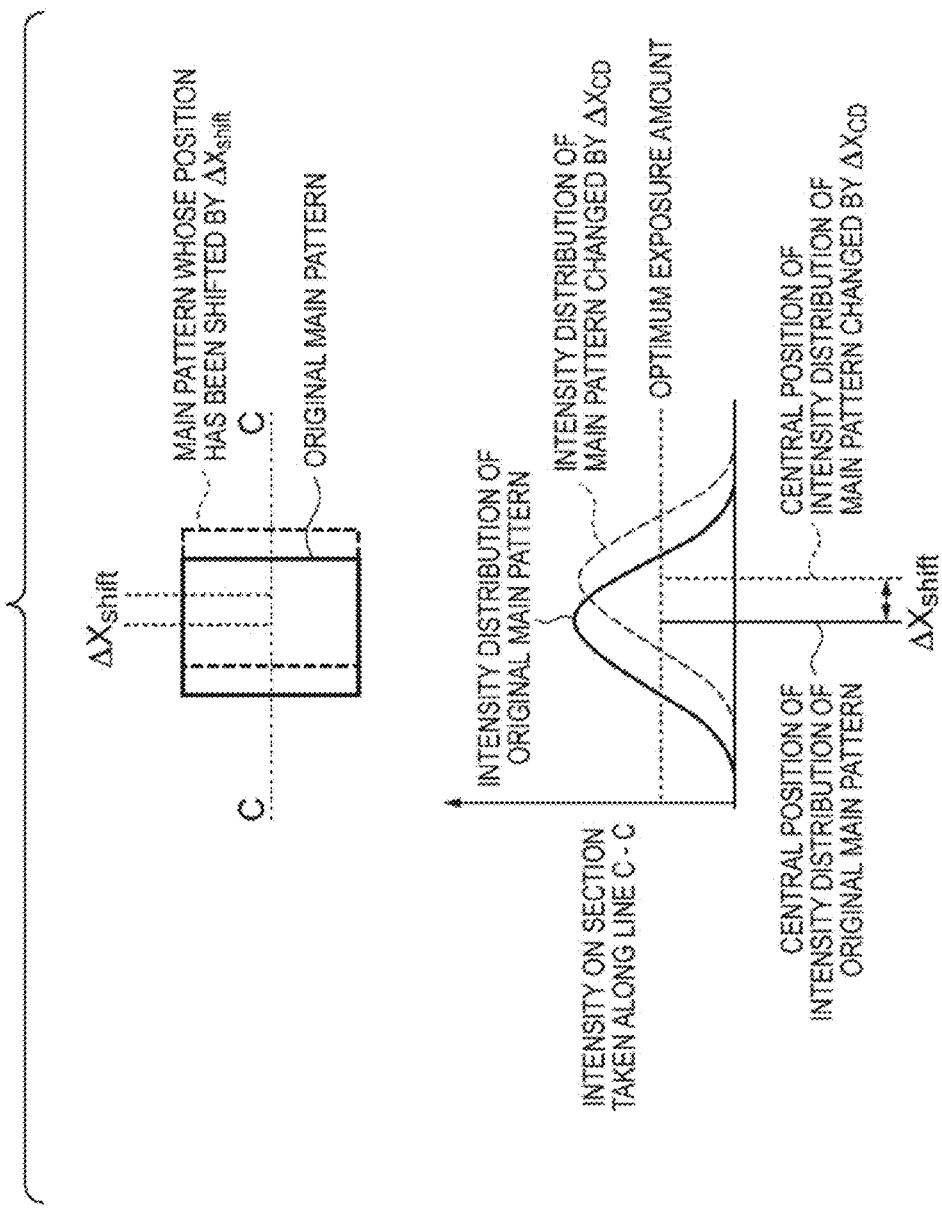

F I G. 5
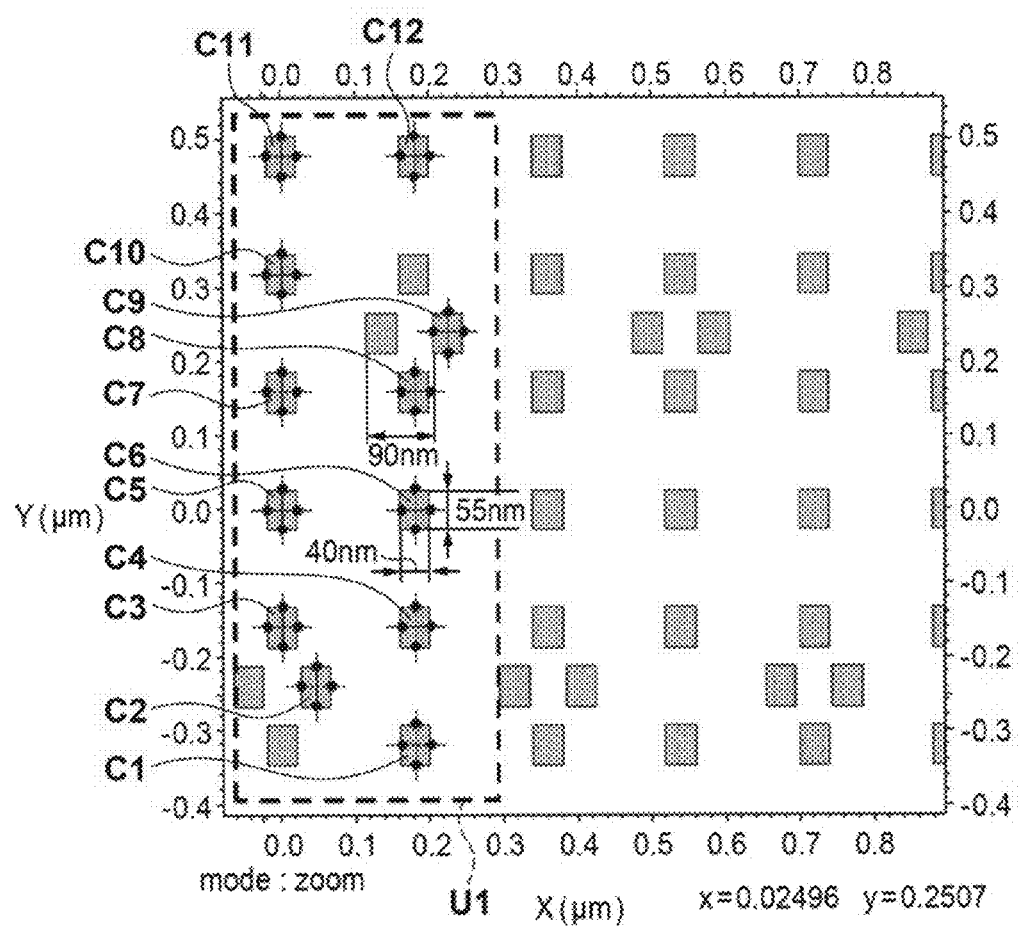

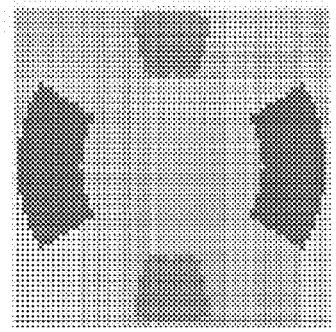
FIG. 7A
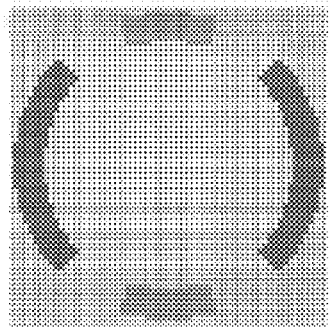
FIG. 7B
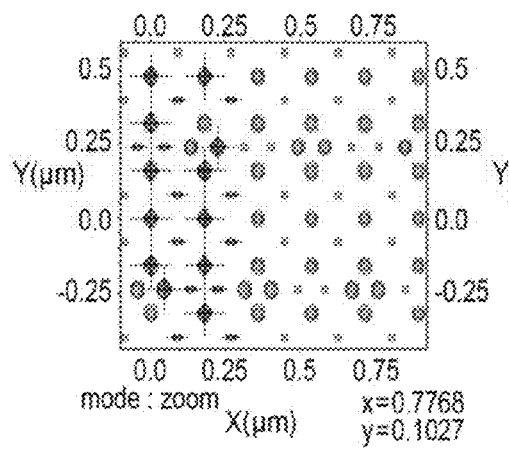
FIG. 7C
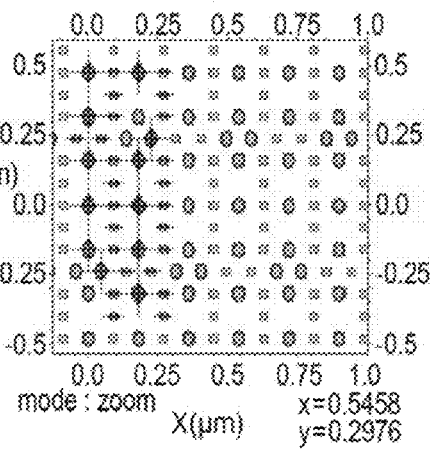
FIG. 7D
FIG. 7E
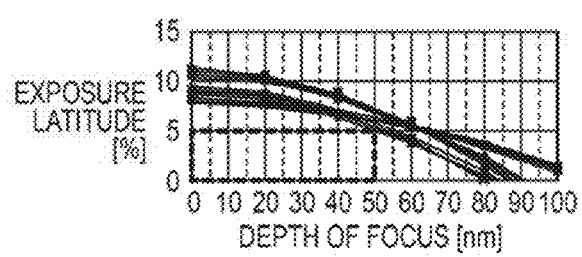
FIG. 7F
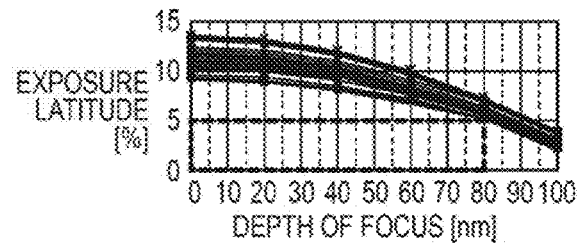

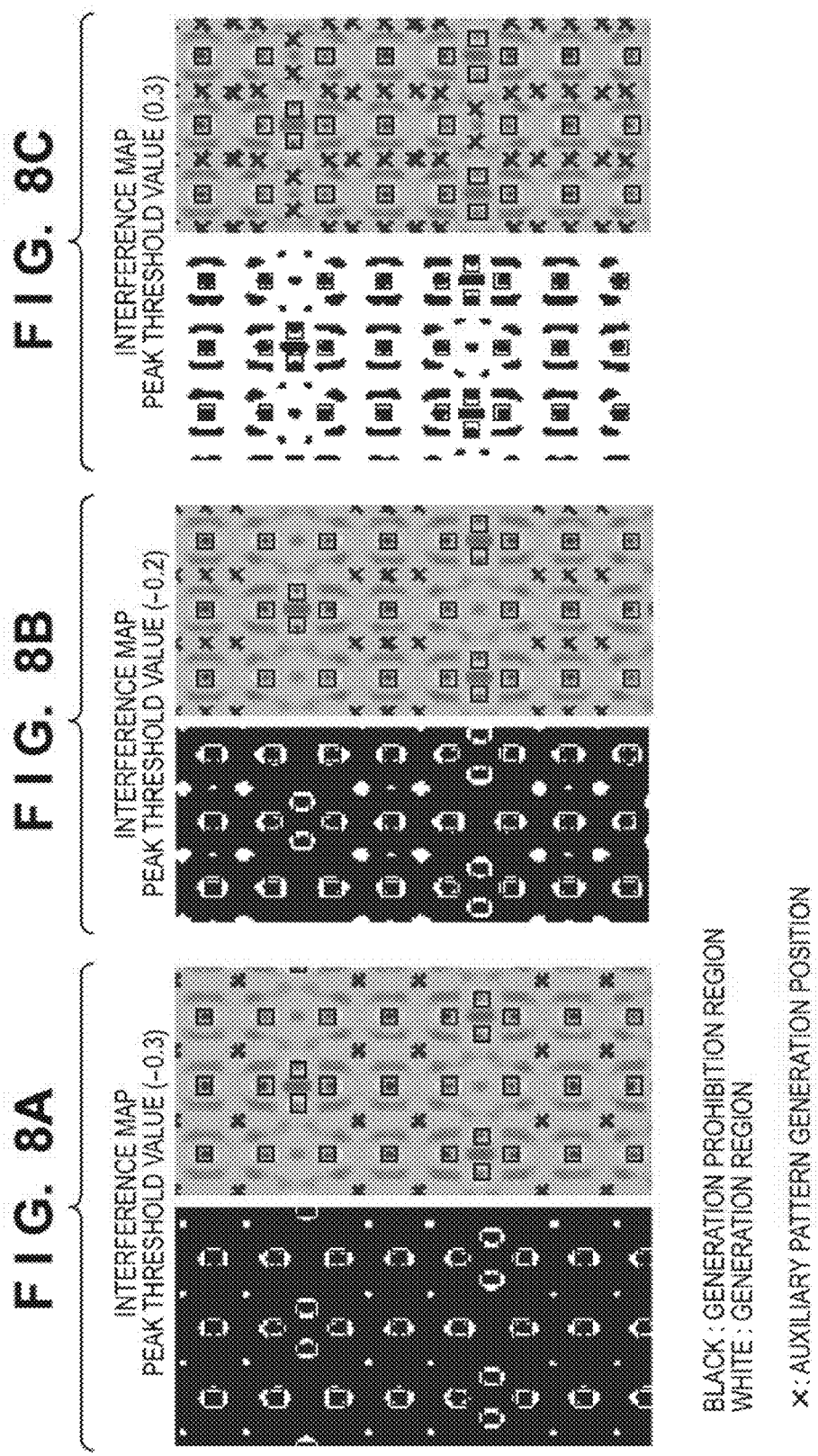

× : AUXILIARY PATTERN GENERATION POSITION

GENERATION METHOD, STORAGE MEDIUM, AND INFORMATION PROCESSING APPARATUS

BACKGROUND OF THE INVENTION

1. Field of the Invention

The present invention relates to a generation method of generating data for a mask pattern to be used for an exposure apparatus, a storage medium, and an information processing apparatus.

2. Description of the Related Art

With the recent advances in micropatterning of semiconductor devices, it has become difficult for an exposure apparatus to transfer (resolve) a pattern. To keep pace with the micropatterning of semiconductor devices, the exposure apparatus adopts resolution enhanced techniques such as modified illumination and optical proximity correction (OPC) to optimize the mask pattern or the illumination shape (effective light source distribution) used to illuminate a mask. The illumination shape indicates a light intensity distribution formed on the pupil plane of an illumination optical system, and also indicates the angle distribution of light which illuminates a mask.

To optimize the illumination shape, a layout pattern (target pattern) for a device, an evaluation position for a transfer pattern (optical image), and an evaluation item (for example, the size, the DOF, or the exposure latitude) at the evaluation position are set. Next, the transfer pattern is calculated while changing the illumination shape, thereby obtaining the value (evaluation value) of the evaluation item at the evaluation position on the transfer pattern. The transfer pattern calculation and the evaluation value obtaining are repeated until the obtained evaluation value falls within a tolerance range or the number of changes in illumination shape reaches a predetermined number. The illumination shape is numerically represented by, for example, a function having inner $\sigma$ and outer $\sigma$ as its parameters (variables), which are optimized using, for example, the Monte Carlo method in annular illumination having a given intensity. Even when the same mask pattern is used, the transfer pattern varies with a variation in illumination shape. The transfer pattern, thus, deviates from the target pattern upon changing the illumination shape. Therefore, OPC is necessary to match the transfer pattern with the target pattern. OPC is done every time the illumination shape is changed or when the illumination shape is changed by a given amount. Note that OPC is limited to correction of the shape of the transfer pattern such as a line width, edge shift, and image shift, and cannot perform correction for resolution performance, such as the contrast of the image and a depth of focus, which is determined based on the effective light source distribution.

U.S. Pat. No. 6,563,566 proposes a technique of setting a pattern to be formed on a substrate (wafer), and calculating the mask pattern and illumination shape optimized by a mathematical approach. The technique disclosed in U.S. Pat. No. 6,563,566 analytically calculates solutions (mask pattern and illumination shape) instead of repeatedly performing calculation. Although the technique disclosed in U.S. Pat. No. 6,563,566 does not adopt OPC, the pattern to be formed on the substrate and the optimized mask pattern are different from each other, and thus this technique can be reckoned as an illumination shape optimization technique including mask pattern correction in a broad sense.

Furthermore, Japanese Patent Laid-Open Nos. 2009-93138 and 2009-94109 propose a technique of inserting an auxiliary pattern (a pattern which itself is not resolved) to a main pattern (a pattern which itself is resolved) to reduce the difference in resolution performance between a fine, dense pattern and an isolated pattern. The technique described in Japanese Patent Laid-Open Nos. 2009-93138 and 2009-94109 inserts an auxiliary pattern at the peak (Laplacian peak) position of an aerial image approximation with 2D-TCC.

The technique disclosed in U.S. Pat. No. 6,563,566 has a merit that it analytically calculates solutions, but needs to limit the evaluation item to the tilt of an optical image, and to limit the type of pattern to be formed on the substrate to one specific type. As described above, the technique described in U.S. Pat. No. 6,563,566 is impractical because it has a demerit of a small number of degrees of freedom.

On the other hand, the technique disclosed in Japanese Patent Laid-Open Nos. 2009-93138 and 2009-94109 sets, for the known illumination shape, a fixed generation condition under which an auxiliary pattern is generated, that is, a method of inserting an auxiliary pattern. The technique described in Japanese Patent Laid-Open Nos. 2009-93138 and 2009-94109 cannot always determine an optimum illumination condition and mask pattern.

SUMMARY OF THE INVENTION

The present invention provides a technique advantageous in generating data for a mask pattern including an auxiliary pattern to be used for an exposure apparatus.

According to one aspect of the present invention, there is provided a generation method of generating data for a mask pattern to be used for an exposure apparatus including a projection optical system for projecting a mask pattern including a main pattern and auxiliary pattern onto a substrate, including a first step of setting a generation condition under which the auxiliary pattern is generated, a second step of calculating an image of the mask pattern to be formed on the substrate by the projection optical system using a set exposure condition in the exposure apparatus and a mask pattern including a set main pattern and the auxiliary pattern generated according to the set generation condition, and a third step of determining whether a value of an evaluation function describing an index which indicates a quality of the image of the mask pattern calculated in the second step falls within a tolerance range, wherein if it is determined that the value of the evaluation function falls within the tolerance range, data including the set main pattern and the auxiliary pattern generated according to the generation condition set in the first step is generated as the data for the mask pattern, and if it is determined that the value of the evaluation function falls outside the tolerance range, the generation condition is changed to set a new generation condition in the first step, and the second step and the third step are executed using the new generation condition.

Further features of the present invention will become apparent from the following description of exemplary embodiments with reference to the attached drawings.

BRIEF DESCRIPTION OF THE DRAWINGS

FIGS. 1A and 1B are flowcharts for explaining a generation method according to an aspect of the present invention.

FIG. 2 is a view showing the definition of the peak intensity of an auxiliary pattern.

FIG. 3 is a view showing the definition of the line width of a main pattern.

FIG. 4 is a view showing the definition of the position shift of the main pattern.

FIG. 5 is a view showing an example of a mask pattern.

FIGS. 7A to 7F are views showing a result obtained using the generation method according to the embodiment and that obtained using the prior art technique (comparative example).

FIGS. 8A to 8C are views showing mask patterns obtained when an interference map peak threshold value (threshold) is set to −0.3, −0.2, and 0.3, respectively.

DESCRIPTION OF THE EMBODIMENTS

Figure 1B:
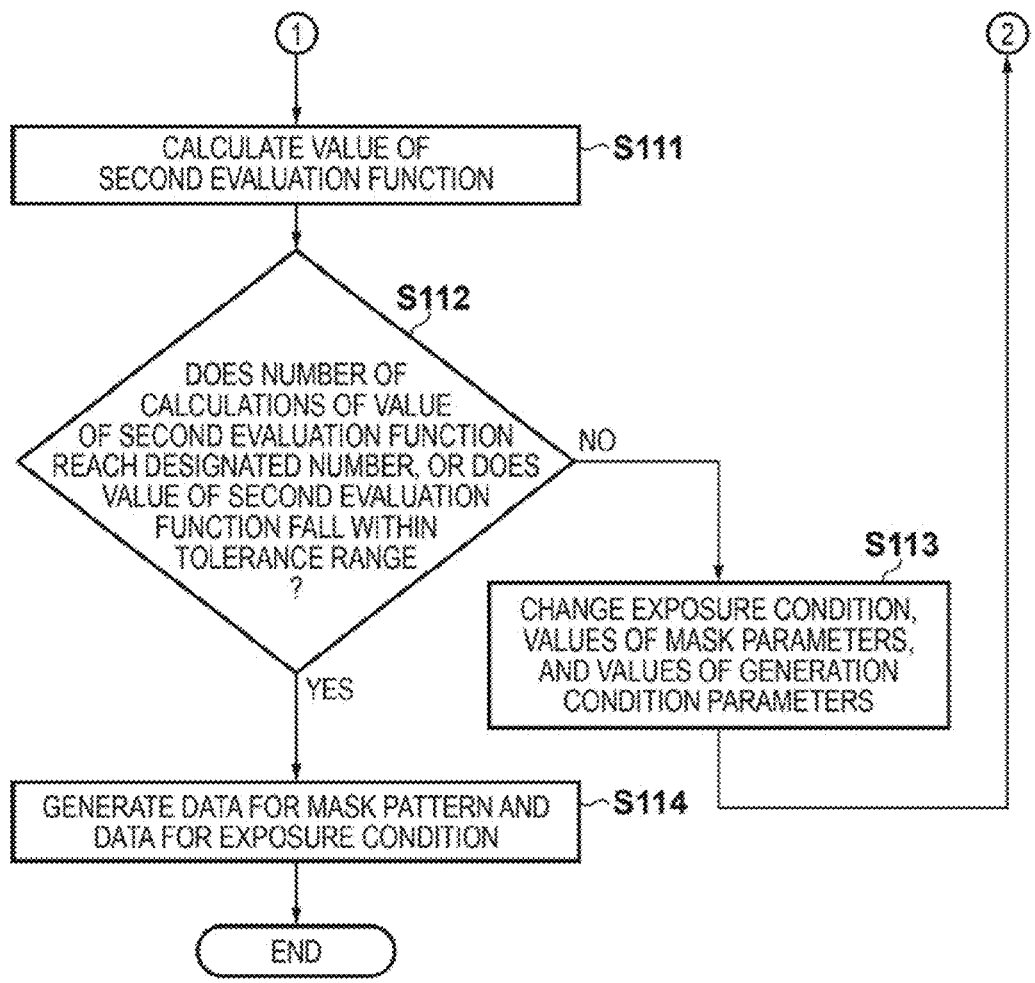

Preferred embodiments of the present invention will be described below with reference to the accompanying drawings. Note that the same reference numerals denote the same members throughout the drawings, and a repetitive description thereof will not be given.

The present invention is applicable to generation of pattern data for a mask (original) to be used for the micromechanics or the manufacture of various devices including a semiconductor chip such as an IC or an LSI, a display device such as a liquid crystal panel, a detection device such as a magnetic head, and an image sensor such as a CCD. The micromechanics indicates a technique of creating a micron-order mechanical system having an advanced function by applying the semiconductor integrated circuit manufacturing technology to the manufacture of a microstructure, or the mechanical system itself. The present invention is preferable to decide (optimize) the mask pattern (data therefor) to be used for an exposure apparatus including a projection optical system for projecting a mask pattern including a main pattern (a pattern which itself is resolved) and an auxiliary pattern (a pattern which itself is not resolved) onto a substrate.

The applicant of the present invention further developed the technique disclosed in U.S. Pat. No. 6,563,566, and proposed a technique of establishing a function describing the mask pattern and the exposure condition to simultaneously decide (optimize) the mask pattern and exposure condition to be used for an exposure apparatus (Japanese Patent Application No. 2010-207153). The applicant of the present invention also proposed a technique of adding a sequence of changing the mask size to the sequence of simultaneously deciding the mask pattern and exposure condition to decide the mask pattern capable of satisfying a high accuracy requirement (Japanese Patent Application No. 2010-234915). Furthermore, the applicant of the present invention proposed a technique of establishing a function describing an auxiliary pattern to optimize the mask pattern including the auxiliary pattern (for example, the size of the auxiliary pattern) (Japanese Patent Application No. 2010-244368). Note that these techniques set a fixed generation condition under which an auxiliary pattern is generated, similarly to the technique described in Japanese Patent Laid-Open Nos. 2009-93138 and 2009-94109.

The present invention optimizes not only the size of the auxiliary pattern but also the generation condition under which an auxiliary pattern is generated, that is, deals with them similarly to the mask pattern and exposure condition, thereby attempting to further improve the resolution of the exposure apparatus. The present invention optimizes the position and size of the auxiliary pattern in the above-described other sequence of changing the mask size, thereby attempting to further improve the resolution of the exposure apparatus.

FIGS. 1A and 1B are flowcharts for explaining a generation method according to an aspect of the present invention. The generation method is executed by an information processing apparatus such as a computer, and generates data for a mask pattern to be used for an exposure apparatus including a projection optical system for projecting a mask pattern including a main pattern and auxiliary pattern onto a substrate.

In step S101, the initial values of an exposure condition in the exposure apparatus, a main pattern parameter for defining a main pattern, and a generation condition under which an auxiliary pattern is generated (generation condition parameters) are set. The exposure condition is settable in the exposure apparatus. The exposure condition includes, for example, the shape of an effective light source (a light intensity distribution to be formed on the pupil plane of an illumination optical system), and the numerical aperture (NA) of the projection optical system. Furthermore, the generation condition is a condition under which at least one of the shape and position of the auxiliary pattern is decided. The generation condition includes, for example, at least one of an interference map peak threshold, the peak obtaining direction of an aerial image approximation with 2D-TCC, a proximity pattern distance, and a defocus value. Note that the interference map peak threshold is an intensity threshold for deciding the position of the auxiliary pattern based on the intensity at each position of the image (aerial image approximation with 2D-TCC) of the mask pattern to be formed on the substrate. The peak obtaining direction is a direction in which the image of the mask pattern to be formed on the substrate is differentiated. The proximity pattern distance is a distance between an auxiliary pattern and adjacent patterns (a main pattern and other auxiliary patterns) required for generating (inserting) the auxiliary pattern. The defocus value is a defocus value for generating an auxiliary pattern.

In step S102, the initial values of the sensitivities of the parameters (main pattern parameter and auxiliary pattern parameter) of the mask pattern and the exposure condition are set. For example, values input by the user are used as the initial values of the sensitivities to be set.

In step S103, the basic position of the auxiliary pattern is set (decided). The basic position of the auxiliary pattern is set according to, for example, the peak of the aerial image approximation with 2D-TCC.

In step S104, the value of an evaluation function for temporarily deciding the mask pattern, that is, the value of a first evaluation function describing an index which indicates the quality of the image of the mask pattern is calculated. First, the image of the mask pattern to be formed on the substrate by the projection optical system is calculated using the set mask pattern and exposure condition. The value of an evaluation index (a line width, a shift, or the like) at each evaluation position of the image of the mask pattern is obtained to calculate the value of the first evaluation function. As the first evaluation function, for example, it is only necessary to use the difference between each of the line width of the main pattern, the position shift of the main pattern, and the peak intensity of the auxiliary pattern, and its target value.

In step S105, it is determined whether the number of calculations of the value of the first evaluation function (that is, the number of repetitions in step S104) is one. If the number of calculations of the value of the first evaluation function is not one, the process advances to step S106; otherwise, the process advances to step S107.

In step S106, the sensitivities are calculated and set. First, the value of each evaluation index described by the first evaluation function is obtained. Based on a change in value of each evaluation index and that in parameter of the mask pattern, a sensitivity indicating the rate of change of the evaluation index with respect to the parameter of the mask pattern is calculated. The calculated sensitivity is compared with the sensitivity tolerance range set in advance. If the calculated sensitivity falls within the tolerance range, it is set intact; otherwise, it is modified to fall within the tolerance range, and is then set. This enables to prevent the solutions from diverging when the sensitivity is too small, or to prevent the solutions from converging too slow when the sensitivity is too large.

In step S107, the initial values of the sensitivities set in step S102 are set as the sensitivity. This is done because it is impossible to calculate the sensitivities when the number of calculations of the value of the first evaluation function is one.

In step S108, the values of the parameters of the mask pattern, that is, the values of the main pattern parameter and auxiliary pattern parameter are decided (temporarily decided). Based on the sensitivities of the mask parameters set in step S106 or S107 and the difference with reference to the target value of each evaluation index, the values of the parameters of the mask pattern to be evaluated next are decided.

In step S109, it is determined whether the number of decisions of the mask parameters (that is, the number of repetitions in step S108) reaches a designated number or the value of the first evaluation function falls within the tolerance range. If the number of decisions of the mask parameters does not reach the designated number or the value of the first evaluation functions does not fall within the tolerance range, the process advances to step S110. If the number of decisions of the mask parameters reaches the designated number or the value of the first evaluation functions falls within the tolerance range, the process advances to step S111.

In step S110, the values of the parameters of the mask pattern, that is, the values of the main pattern parameter and auxiliary pattern parameter are changed to those of the main pattern parameter and auxiliary pattern parameter decided in step S108.

In step S111, the value of a function of adding a plurality of evaluation indices as variables, that is, the value of a second evaluation function describing an index which indicates the quality of the image of the mask pattern is calculated. First, the image of the mask pattern to be formed on the substrate by the projection optical system is calculated using the mask pattern decided in step S108 and the set exposure condition. The value of an evaluation index at each evaluation position of the image of the mask pattern is obtained to calculate the value of the second evaluation function. In this embodiment, the second evaluation function P is given by:

$$P=(\text{line width error } RMS/\text{tolerance of line width error } RMS)+(\text{tolerance of } NILS/(\text{minimum value of } NILS+\text{Error}))+(\text{worst value of position shift error/tolerance of position shift error})+(\text{tolerance of depth of focus}/(\text{depth of focus}+\text{Error})) \quad (1)$$

Note that NILS is an abbreviation for "Normalized Image Log Slope".

In step S112, it is determined whether the number of calculations of the value of the second evaluation function (that is, the number of repetitions in step S111) reaches a designated number, or the value of the second evaluation value falls within a tolerance range. If the number of calculations of the value of the second evaluation function does not reach the designated number, or the value of the second evaluation value does not fall within the tolerance range, the process advances to step S113. On the other hand, if the number of calculations of the value of the second evaluation function reaches the designated number, or the value of the second evaluation value falls within the tolerance range, the process advances to step S114.

In step S113, for example, the Nelder-Mead method is used to change the exposure condition, the values of the parameters of the mask pattern (the main pattern parameter and auxiliary pattern parameter), and the values of the generation condition parameters based on the value of the second evaluation function calculated in step S111. In other words, in step S113, the exposure condition, the value of the main pattern parameter, the value of the auxiliary pattern parameter, and the values of the generation condition parameters are set again. The generation condition parameters include various parameters such as the interference map peak threshold and the peak obtaining direction, as described above. Note that in this embodiment, only the interference map peak threshold is set as a parameter for the Nelder-Mead method, and other parameters are fixed. The Nelder-Mead method is also called the down-hill simplex method, which is explained in J. A. Nelder and R. Mead, Computer Journal, Vol. 7, p. 308, 1965.

In step S114, data for the mask pattern and that for the exposure condition are generated. More specifically, data including the main pattern and auxiliary pattern respectively corresponding to the last set values (that is, the values decided in step S108) of the main pattern parameter and auxiliary pattern parameter is generated as data for the mask pattern. An auxiliary pattern is generated according to the auxiliary pattern generation condition (generation condition parameters) changed (set) last in step S113. Furthermore, data corresponding to the last set exposure condition (that is, the exposure condition changed in step S113) is generated as data for the exposure condition in the exposure apparatus.

As described above, the applicant of the present invention proposed the technique of adding a sequence of changing the mask size to the sequence of simultaneously deciding the mask pattern and exposure condition to decide the mask pattern capable of satisfying a high accuracy requirement. In this embodiment, the technique is also applied to decide (optimize) an auxiliary pattern (steps S104 to S109). More specifically, sensitivities are obtained based on the mask size and the peak intensity of an auxiliary pattern to decide (temporarily decide) a main pattern and auxiliary pattern (the parameter values thereof) so that the line width of a target pattern becomes close to a value obtained by multiplying the target value of the intensity by a factor of two or more.

For example, using a change amount $\Delta\text{Peak}$ of the peak intensity upon changing (deforming) the size of the auxiliary pattern by $\Delta X_{Peak}$ a sensitivity $S_{Peak}$ of the peak intensity of the auxiliary pattern is given by:

$$S_{Peak}=\Delta\text{Peak}/\Delta X_{Peak} \quad (2)$$

Assume that the peak intensity of the auxiliary pattern is defined, as shown in FIG. 2.

Using a change amount $\Delta CD$ of a line width upon changing the size of the main pattern by $\Delta X_{CD}$, a line width $S_{CD}$ of the main pattern is given by:

$$S_{CD}=\Delta CD/\Delta X_{CD} \quad (3)$$

Assume that the line width of the main pattern is defined, as shown in FIG. 3.

Using a change amount ΔShift of the central position upon changing the central position of the main pattern by $\Delta X_{Shift}$, a position shift $S_{Shift}$ of the main pattern is given by:

$$S_{Shift} = \Delta Shift / \Delta X_{Shift} \tag{4}$$

Assume that the position shift of the main pattern is defined, as shown in FIG. 4.

In step S108, let $X_{Peak2}$ be a decision value, $X_{Peak}$ be the size of the current auxiliary pattern, P be the peak intensity for $X_{Peak}$, and $P_{target}$ be the target value of the peak intensity. Then, an equation for deciding the value of the auxiliary pattern parameter is represented by:

$$X_{Peak2} = X_{Peak} - (P - P_{target})/S_{Peak} \tag{5}$$

Furthermore, let $X_{CD2}$ be a decision value, $X_{CD}$ be the size of the current main pattern, CD be a line width for $X_{CD}$, and $CD_{target}$ be the target value of the line width. Then, an equation for deciding the line width of the main pattern is presented by:

$$X_{CD2} = X_{CD} - (CD - CD_{target})/S_{CD} \tag{6}$$

Similarly, let $X_{Shift2}$ be a decision value, $X_{Shift}$ be the central position of the current main pattern, Shift be a line width for $X_{Shift}$, and $Shift_{target}$ be the target value of the line width. Then, an equation for deciding the central position of the main pattern is represented by:

$$X_{Shift2} = X_{Shift} - (Shift - Shift_{target})/S_{Shift} \tag{7}$$

The mask pattern and exposure condition (that is, the optimized mask pattern and exposure condition in the embodiment) corresponding to data for the mask pattern and data for the exposure condition which are generated according to the generation method of this embodiment will be described below.

As shown in FIG. 5, the mask pattern corresponding to the target pattern to be formed on the substrate is a pattern corresponding to the contact process of a 20-nm node. The patterns of the mask pattern shown in FIG. 5 are classified into patterns C1 to C12 in consideration of symmetry, and are patterns obtained by repeating a pattern unit U1 including the patterns C1 to C12. Parameters of each of the patterns C1 to C12 include hole sizes in the X and Y directions and central position shifts in the X and Y directions. Therefore, 48 parameters define the mask pattern shown in FIG. 5. The hole sizes in the X and Y directions of each of the patterns C1 to C12 on the image plane of the projection optical system are 40 nm and 55 nm, respectively. Both image plane-converted mask sizes in the X and Y directions on the image plane fall within the range from 30 to 100 nm. Both the position shifts in the X and Y directions fall within the range of ±5 nm.

Figure 6A:
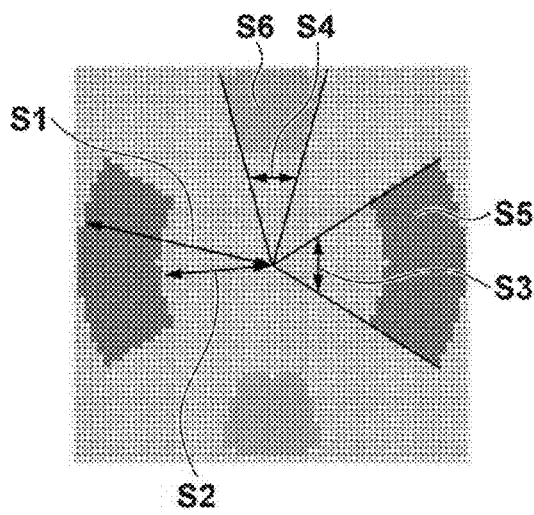
FIGS. 6A and 6B are views showing an effective light source as an exposure condition.
Figure 6B:
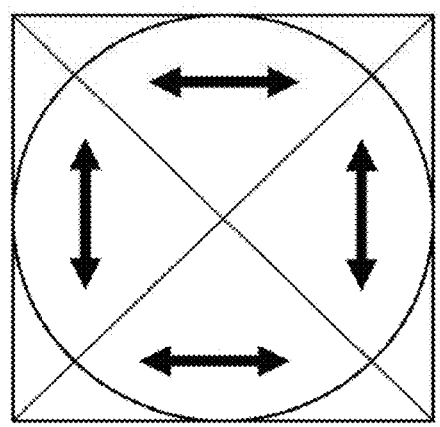

FIGS. 6A and 6B are views showing an effective light source as an exposure condition. The effective light source is asymmetric quadrupole illumination, and is defined by parameters S1 to S7, as shown in FIG. 6A. The parameter S1 represents an outer sigma (which ranges from 0.70 to 0.98), and the parameter S2 represents an inner sigma. Note that in this embodiment, instead of the inner sigma represented by the parameter S2, a sigma ratio S2/S1 (which ranges from 0.5 to 0.8) is used. The parameter S3 represents the aperture angle (which ranges from 20 to 90°) in the X direction of a dipole, and the parameter S4 represents the aperture angle (which ranges from 20 to 90°) in the Y direction of the dipole. The parameter S5 represents the intensity (which ranges from 0 to 1) in the X direction of the dipole, and the parameter S6 represents the intensity (which ranges from 0 to 1) in the Y direction of the dipole.

The polarization of the effective light source is 4-division tangential polarization, as shown in FIG. 6B. As another exposure condition, the numerical aperture (NA) of the projection optical system is fixed at 1.35.

In this embodiment, the target value of the peak intensity of the auxiliary pattern is set so that the auxiliary pattern is not resolved and the line width of the target pattern becomes close to 0.8 with respect to the target value of the intensity. Furthermore, the target value of the line width error is set to 5%. The target value of the position shift error is set to 1 nm. The target value of NILS is set to 0.7. The target value of the depth of focus is set to 70 nm. The depth of focus (Process Window) is defined within a defocus range where the exposure latitude is equal to or larger than 5% when the line width error falls within the range of ±10%.

FIGS. 7A to 7F are views showing a result obtained using the generation method according to the embodiment and that obtained using a combination (comparative example) of the prior art techniques disclosed in Japanese Patent Application Nos. 2010-234915 and 2010-244368. More specifically, in the comparative example, a mask pattern without any auxiliary pattern, that is, a main pattern, and effective light source are simultaneously decided, and the basic position of an auxiliary pattern is set based on the decided main pattern and effective light source to decide its shape.

FIG. 7A shows the effective light source obtained in the comparative example. FIG. 7B shows an effective light source obtained by the generation method according to the embodiment. By comparing FIGS. 7A and 7B, it is apparent that the effective light source obtained by the generation method of this embodiment is very different from that obtained in the comparative example.

FIG. 7C shows the mask pattern obtained in the comparative example, and FIG. 7D shows a mask pattern obtained by the generation method of this embodiment. By comparing FIGS. 7C and 7D, the mask pattern obtained by the generation method of this embodiment includes a large number of auxiliary patterns, as compared with the mask pattern obtained in the comparative example, and the resolution of the main pattern of the mask pattern of this embodiment improves.

FIG. 7E shows a result obtained by evaluating the depth of focus when illuminating the mask pattern shown in FIG. 7C using the effective light source shown in FIG. 7A. FIG. 7F shows a result obtained by evaluating the depth of focus when illuminating the mask pattern shown in FIG. 7D using the effective light source shown in FIG. 7B. Referring to FIGS. 7E and 7F, the ordinate represents the exposure latitude when the line width error falls within the range of ±10%, and the abscissa represents the depth of focus. Assume that the tolerance of the exposure latitude is 5%. In this case, in the comparative example, the depth of focus is 50 nm, as shown in FIG. 7E. In this embodiment, however, the depth of focus is 80 nm as shown in FIG. 7F, and it is thus apparent that the depth of focus has significantly improved.

As described above, the generation method of this embodiment can optimize the generation condition under which an auxiliary pattern is generated in optimization of the mask pattern and exposure condition, thereby deciding the mask pattern and exposure condition with imaging performance higher than that of the prior art technique.

Figure 9A:
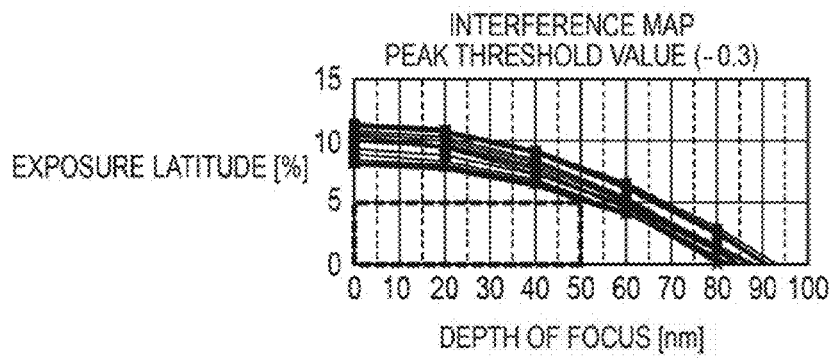
FIGS. 9A to 9C are graphs showing results obtained by evaluating a depth of focus for the mask patterns shown in FIGS. 8A to 8C, respectively.
Figure 9B:
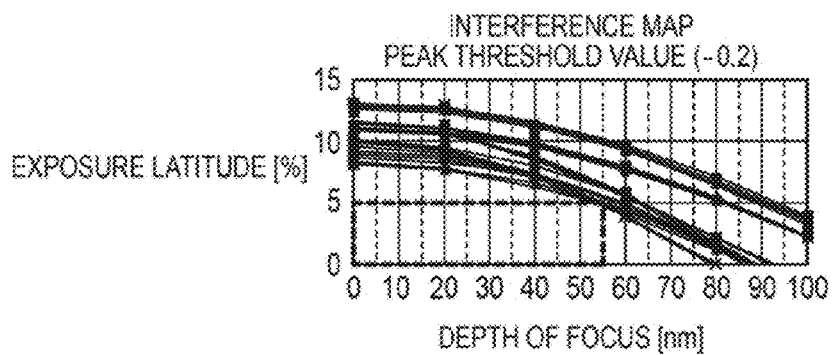
Figure 9C:
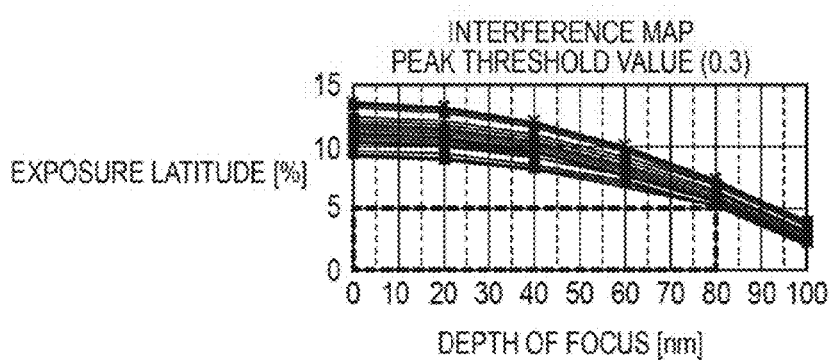

FIGS. 8A to 8C show mask patterns obtained using the generation method of this embodiment when the interference map peak threshold value (threshold) as the generation condition under which an auxiliary pattern is generated is set to −0.3, −0.2, and 0.3, respectively. Referring to FIGS. 8A to 8C, as the generation condition (interference map peak threshold value) is changed, an auxiliary pattern to be inserted to the main pattern changes. FIGS. 9A to 9C show results obtained by evaluating the depth of focus for the mask patterns shown in FIG. 8A to 8C, respectively. Referring to FIGS. 9A to 9C, the ordinate represents the exposure latitude when the line width error falls within the range of ±10%, and the abscissa represents the depth of focus.

Figure 10A:
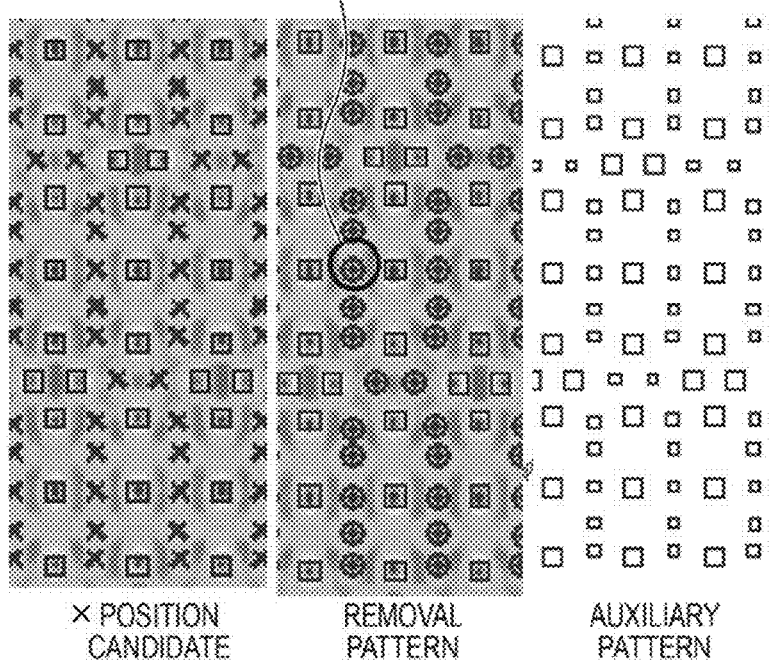
FIGS. 10A and 10B are views showing mask patterns obtained when a proximity pattern distance is set to correspond to k1=0.3 (43 nm) and k1=0.6 (86 nm), respectively.
Figure 10B:
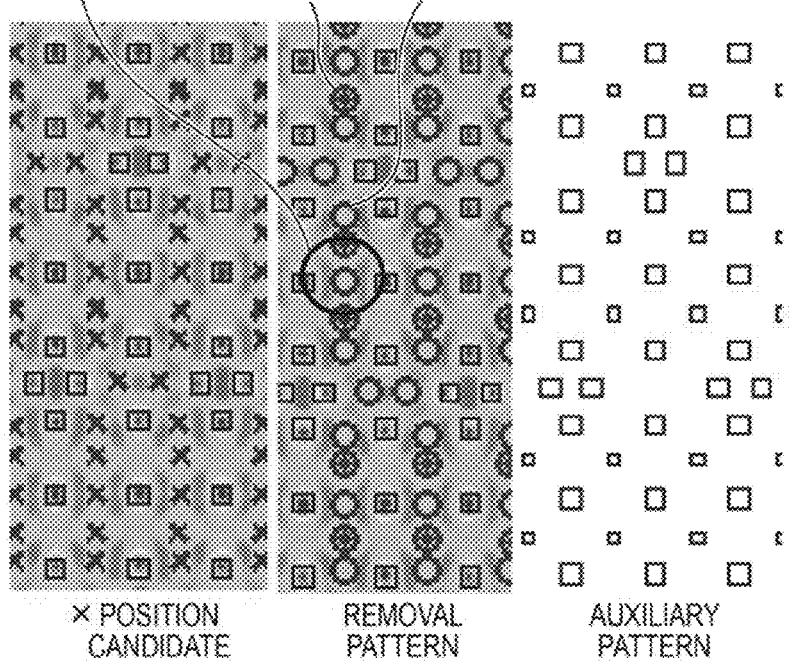

FIGS. 10A and 10B show mask patterns obtained using the generation method of this embodiment when the proximity pattern distance as the generation condition under which an auxiliary pattern is generated is set to correspond to k1=0.3 (43 nm) and k1=0.6 (86 nm), respectively. Referring to FIGS. 10A and 10B, as the generation condition (proximity pattern distance) is changed, an auxiliary pattern to be inserted to the main pattern changes.

Figure 11A:
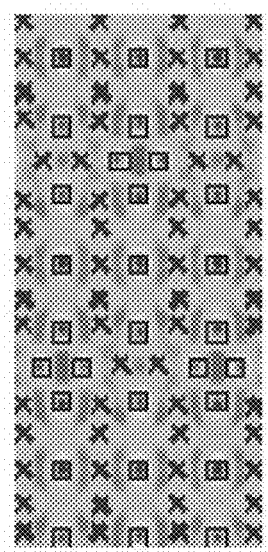
FIGS. 11A to 11C are views showing mask patterns obtained when a defocus value is set to 30 nm, 150 nm, and 200 nm, respectively.
Figure 11B:
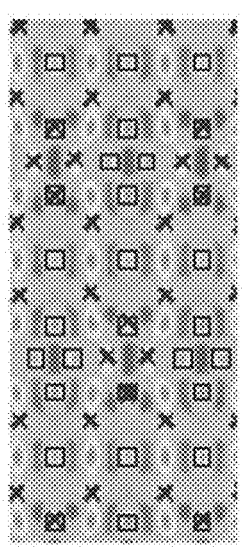
Figure 11C:
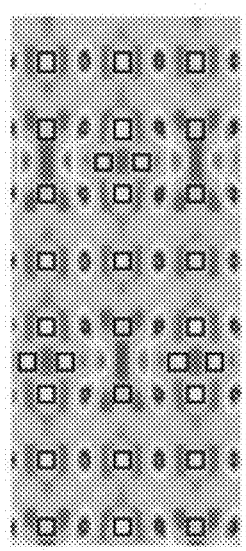

FIGS. 11A to 11C show mask patterns obtained using the generation method of this embodiment when the defocus value as the generation condition under which an auxiliary pattern is generated is set to 30 nm, 150 nm, and 200 nm, respectively. Referring to FIGS. 11A to 11C, as the generation condition (defocus value) is changed, an auxiliary pattern to be inserted to the main pattern changes.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A generation method of generating data for a mask pattern to be used for an exposure apparatus including a projection optical system for projecting a mask pattern including a main pattern and auxiliary pattern onto a substrate, comprising:
    a first step of setting a main pattern as a mask pattern;
    a second step of setting a generation condition under which the auxiliary pattern for the main pattern is newly generated in the set mask pattern;
    a third step of newly generating, based on an image of the set mask pattern, an auxiliary pattern according to the generation condition and setting a pattern including the main pattern and the newly generated auxiliary pattern as a mask pattern;
    a fourth step of calculating, using a processer, an image of the mask pattern to be projected on the substrate by the projection optical system using a set exposure condition in the exposure apparatus and the mask pattern including the main pattern and the newly generated auxiliary pattern; and
    a fifth step of determining whether a value of an evaluation function describing an index which indicates a quality of the image of the mask pattern calculated in the fourth step falls within a tolerance range,
    wherein if it is determined that the value of the evaluation function falls within the tolerance range, data including the main pattern and the newly generated auxiliary pattern is generated as the data for the mask pattern, and
    if it is determined that the value of the evaluation function falls outside the tolerance range, the generation condition is changed to set a new generation condition in the second step, and the third step, the fourth step and the fifth step are executed using the new generation condition.

2. The method according to claim 1, wherein if it is determined that the value of the evaluation function falls within the tolerance range, data corresponding to the set exposure condition when calculating the image of the mask pattern in the fourth step is generated as data for the exposure condition in the exposure apparatus, and
    if it is determined that the value of the evaluation function falls outside the tolerance range, the set exposure condition when calculating the image of the mask pattern in the fourth step is changed to set a new exposure condition, and the fourth step and the fifth step are executed using the new exposure condition.

3. The method according to claim 1, wherein if it is determined that the value of the evaluation function falls outside the tolerance range, the main pattern when calculating the image of the mask pattern in the fourth step is changed to set a new main pattern, and the fourth step and the fifth step are executed using the new main pattern.

4. The method according to claim 1, wherein the generation condition is at least an intensity threshold for deciding the position of the auxiliary pattern based on an intensity at each position of the image of the mask pattern to be formed on the substrate.

5. The method according to claim 1, wherein the generation condition is a direction in which the image to be projected on the substrate is differentiated.

6. The method according to claim 1, wherein the generation condition is a required distance between the auxiliary pattern and an adjacent pattern, which is required for generating the auxiliary pattern.

7. The method according to claim 1, wherein the generation condition is a defocus value of an image of the mask pattern.

8. A non-transitory storage medium storing a program for causing a computer to execute a generation method of generating data for a mask pattern to be used for an exposure apparatus including a projection optical system for projecting a mask pattern including a main pattern and auxiliary pattern onto a substrate, wherein
    the program causes the computer to execute
    a first step of setting a main pattern as a mask pattern;
    a second step of setting a generation condition under which the auxiliary pattern for the main pattern is newly generated in the set mask pattern,
    a third step of newly generating, based on an image of the set mask pattern, an auxiliary pattern according to the generation condition and setting a pattern including the main pattern and the newly generated auxiliary pattern as a mask pattern;
    a fourth step of calculating an image of the mask pattern to be projected on the substrate by the projection optical system using a set exposure condition in the exposure apparatus and the mask pattern including the main pattern and the newly generated auxiliary pattern, and
    a fifth step of determining whether a value of an evaluation function describing an index which indicates a quality of the image of the mask pattern calculated in the fourth step falls within a tolerance range,
    if it is determined that the value of the evaluation function falls within the tolerance range, data including the main pattern and the newly generated auxiliary pattern is generated as the data for the mask pattern, and if it is determined that the value of the evaluation function falls outside the tolerance range, the generation condition is changed to set a new generation condition in the second step, and the third setting step, the fourth step and the fifth step are executed using the new generation condition.

9. An information processing apparatus for generating data for a mask pattern to be used for an exposure apparatus including a projection optical system for projecting a mask pattern including a main pattern and auxiliary pattern onto a substrate, wherein the apparatus comprises a processor configured to execute the following steps:

a first step of setting a main pattern as a mask pattern;

a second step of setting a generation condition under which the auxiliary pattern for the main pattern is newly generated in the set mask pattern, a third setting step of newly generating, based on an image of the set mask pattern, an auxiliary pattern according to the generation condition and setting a pattern including the main pattern and the newly generated auxiliary pattern as a mask pattern;

a fourth step of calculating an image of the mask pattern to be projected on the substrate by the projection optical system using a set exposure condition in the exposure apparatus and the mask pattern including the main pattern and the newly generated auxiliary pattern, and a fifth step of determining whether a value of an evaluation function describing an index which indicates a quality of the image of the mask pattern calculated in the fourth step falls within a tolerance range, if it is determined that the value of the evaluation function falls within the tolerance range, data including the main pattern and the newly generated auxiliary pattern is generated as the data for the mask pattern, and if it is determined that the value of the evaluation function falls outside the tolerance range, the generation condition is changed to set a new generation condition in the second step, and the third setting step, the fourth step and the fifth step are executed using the new generation condition.

* * * * *